(12) United States Patent
Cherry et al.

(10) Patent No.: US 9,378,397 B2
(45) Date of Patent: Jun. 28, 2016

(54) PORTAL DATA READER INDICATOR LIGHT CONTROL

(71) Applicant: Datalogic ADC, Inc., Eugene, OR (US)

(72) Inventors: Craig D. Cherry, Eugene, OR (US); Michael P. Svetal, Eugene, OR (US)

(73) Assignee: DATALOGIC ADC, INC., Eugene, OR (US)

( * ) Notice: Subject to any disclaimer, the term of this patent is extended or adjusted under 35 U.S.C. 154(b) by 0 days.

(21) Appl. No.: 13/942,620

(22) Filed: Jul. 15, 2013

(65) Prior Publication Data

US 2014/0021260 A1 Jan. 23, 2014

Related U.S. Application Data

(60) Provisional application No. 61/673,145, filed on Jul. 18, 2012.

(51) Int. Cl.
| | |
|---|---|
| *G06K 15/00* | (2006.01) |
| *G06K 7/00* | (2006.01) |
| *G06K 13/00* | (2006.01) |
| *G06Q 20/00* | (2012.01) |
| *G06K 7/01* | (2006.01) |
| *G06K 7/10* | (2006.01) |
| *G06Q 10/08* | (2012.01) |

(Continued)

(52) U.S. Cl.
CPC . *G06K 7/01* (2013.01); *A47F 9/048* (2013.01); *G06K 7/10821* (2013.01); *G06Q 10/08* (2013.01); *G06Q 10/087* (2013.01); *G07G 1/0045* (2013.01); *G07G 1/0063* (2013.01)

(58) Field of Classification Search
CPC ..... G07G 1/00; G07G 1/0036; G07G 1/0045; G07G 3/00; G06K 7/01; G06K 7/1082; A47F 9/048; G06Q 10/08; G06Q 10/087
USPC .................. 235/383, 435, 475, 477, 235/462.01–462.49; 705/16
See application file for complete search history.

(56) References Cited

U.S. PATENT DOCUMENTS

| | | | |
|---|---|---|---|
| 4,676,343 | A | 6/1987 | Humble et al. |
| 4,679,154 | A | 7/1987 | Blanford |

(Continued)

FOREIGN PATENT DOCUMENTS

JP 2178102 7/1990

OTHER PUBLICATIONS

International Searching Authority, PCT/US2013/050925, International Search Report and Written Opinion, Oct. 7, 2013.

(Continued)

*Primary Examiner* — Laura Gudorf
(74) *Attorney, Agent, or Firm* — Stoel Rives LLP (57) ABSTRACT

An automated checkout system and method including a conveyor system that automatically transports objects along an item path through a read zone of a data reader (such as a portal data reader, tunnel scanner or other type of automated reader) and to an exit zone, an indicator system disposed in or along the exit zone that provides indication as to whether an item has been identified by the portal data reader. In one example, the indicator system includes lights at an indicator location that are selectively alighted a given color for the duration of the item passing the indicator location depending upon whether the reader successfully read the item (e.g., color green) or unsuccessfully read the item (e.g., color red).

24 Claims, 9 Drawing Sheets

(51) Int. Cl.
   *G07G 1/00*     (2006.01)
   *A47F 9/04*     (2006.01)

(56) References Cited

U.S. PATENT DOCUMENTS

| | | | |
|---|---|---|---|
| 6,332,575 B1* | 12/2001 | Schuessler | G06K 7/10693 |
| | | | 235/462.13 |
| 6,446,870 B1 | 9/2002 | Rando | |
| 7,780,081 B1 | 8/2010 | Liang | |
| 7,905,410 B2 | 3/2011 | Good et al. | |
| 8,061,605 B2 | 11/2011 | Lee | |
| 2003/0136842 A1* | 7/2003 | Zosel et al. | 235/462.22 |
| 2005/0189412 A1 | 9/2005 | Hudnut et al. | |
| 2006/0261157 A1 | 11/2006 | Ostrowski et al. | |
| 2007/0158417 A1* | 7/2007 | Brewington | 235/383 |
| 2009/0045261 A1* | 2/2009 | Pine | 235/462.42 |
| 2010/0140357 A1 | 6/2010 | Roslak et al. | |
| 2010/0158310 A1* | 6/2010 | McQueen et al. | 382/100 |
| 2010/0217678 A1* | 8/2010 | Goncalves | 705/22 |
| 2011/0315770 A1 | 12/2011 | Patel et al. | |
| 2012/0187194 A1 | 7/2012 | Svetal et al. | |
| 2012/0187195 A1 | 7/2012 | Actis et al. | |
| 2013/0020391 A1 | 1/2013 | Olmstead et al. | |
| 2013/0020392 A1 | 1/2013 | Olmstead et al. | |
| 2013/0292470 A1 | 11/2013 | Shearin et al. | |

OTHER PUBLICATIONS

International Searching Authority, PCT/US2013/050925, International Preliminary Report on Patentability and Written Opinion, Jan. 29, 2015.

* cited by examiner

PORTAL DATA READER INDICATOR LIGHT CONTROL

RELATED APPLICATION DATA

This application claims priority under 35 U.S.C. 119(e) to U.S. provisional application No. 61/673,145 filed Jul. 18, 2012, hereby incorporated by reference.

BACKGROUND

The field of the present disclosure relates to systems and methods for item checkout and in certain aspects to retail checkstands or other checkout stands (e.g., a parcel distribution station) that incorporate data readers and other electronic devices. The field of the present disclosure further relates generally to data reading devices, and more particularly to automated devices by which items are conveyed, typically on a conveyor, through a read zone of the data reader by which the items are identified such as, for example, by reading optical codes or RFID (radio frequency identification) tags on the items.

Various types of optical code readers, also known as scanners, such as manual readers, semi-automatic readers and automated readers, are available to acquire and decode the information encoded in optical codes. In a manual reader (e.g., a hand-held type reader or a fixed-position reader), a human operator positions an object relative to the reader to read the optical code associated with the object. In a semi-automatic reader, either checker-assisted or self-checkout, objects are moved one at a time by the user into or through the read zone of the reader and the reader then reads the optical code on the object. In an automated reader (e.g., a portal or tunnel scanner), an object is automatically positioned (e.g., transported through the read zone via a conveying system) relative to the reader, with the reader automatically reading the optical code on the object as the object is passed through the read zone of the reader.

The operation of a portal scanner is therefore much different because items are moved not manually (as in a semi-automatic reader) but automatically through the system, possibly with multiple items present in the read zone at the same time, with the operator intervening for resolving exception conditions, such as failure to read a bar code on an item. The present inventors have recognized that traditional semi-automatic scanner good read/no read indicators may not be suitable for portal scanner systems.

DETAILED DESCRIPTION OF DISCLOSED EMBODIMENTS

With reference to the above-listed drawings, this section describes particular embodiments and their detailed construction and operation. The embodiments described herein are set forth by way of illustration only and not limitation. It should be recognized in light of the teachings herein that other embodiments are possible, variations can be made to the embodiments described herein, and there may be equivalents to the components, parts, or steps that make up the described embodiments.

For the sake of clarity and conciseness, certain aspects of components or steps of certain embodiments are presented without undue detail where such detail would be apparent to skilled persons in light of the teachings herein and/or where such detail would obfuscate an understanding of more pertinent aspects of the embodiments.

Various reader systems and associated methods are described herein. In some embodiments, improved automatic imager-based optical code readers are described for identifying and handling exceptions. Various types of exceptions are described in more detail below.

Figure 1:
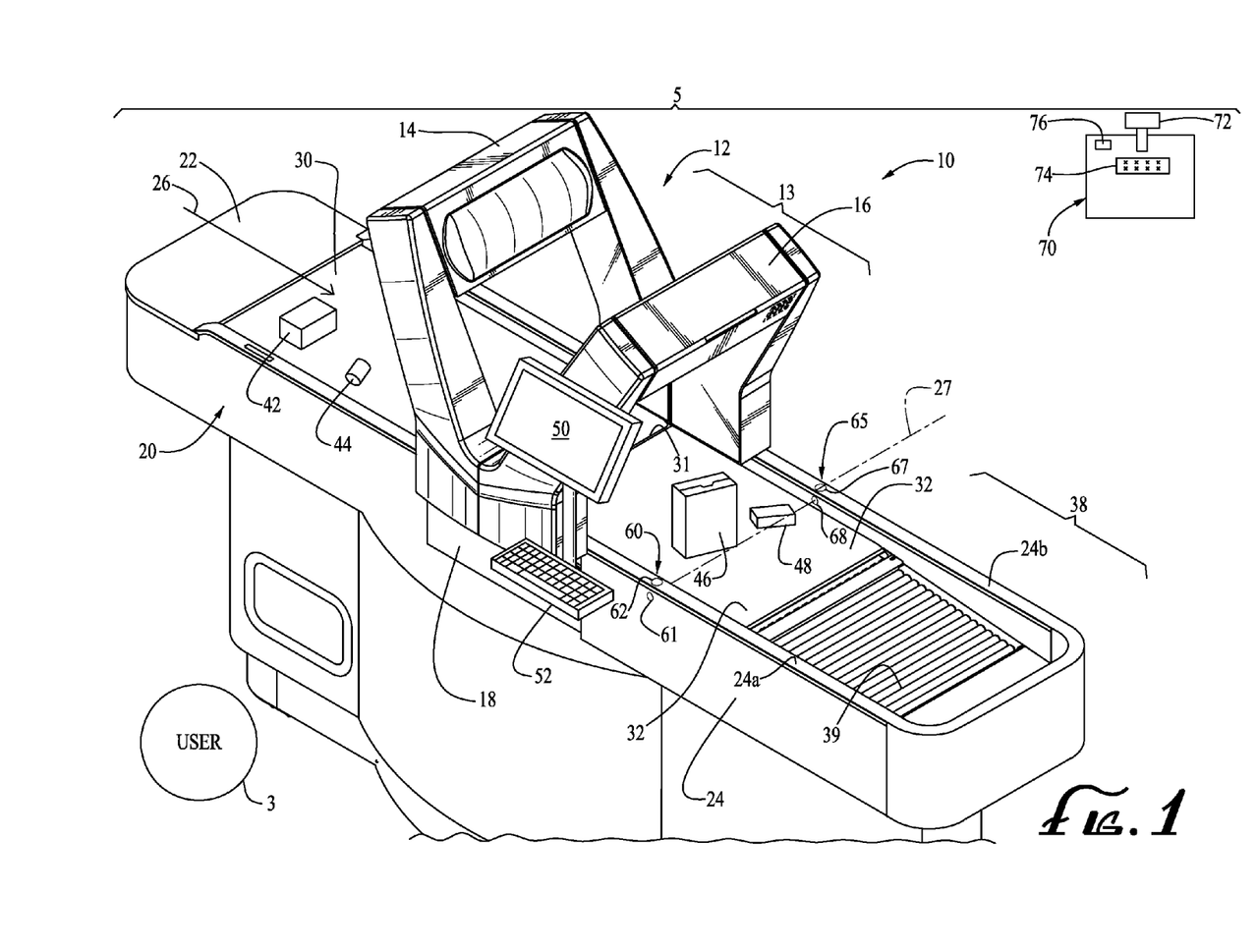
FIG. 1 is a right side isometric view of an automated optical code reading system according to a first embodiment.
Figure 2:
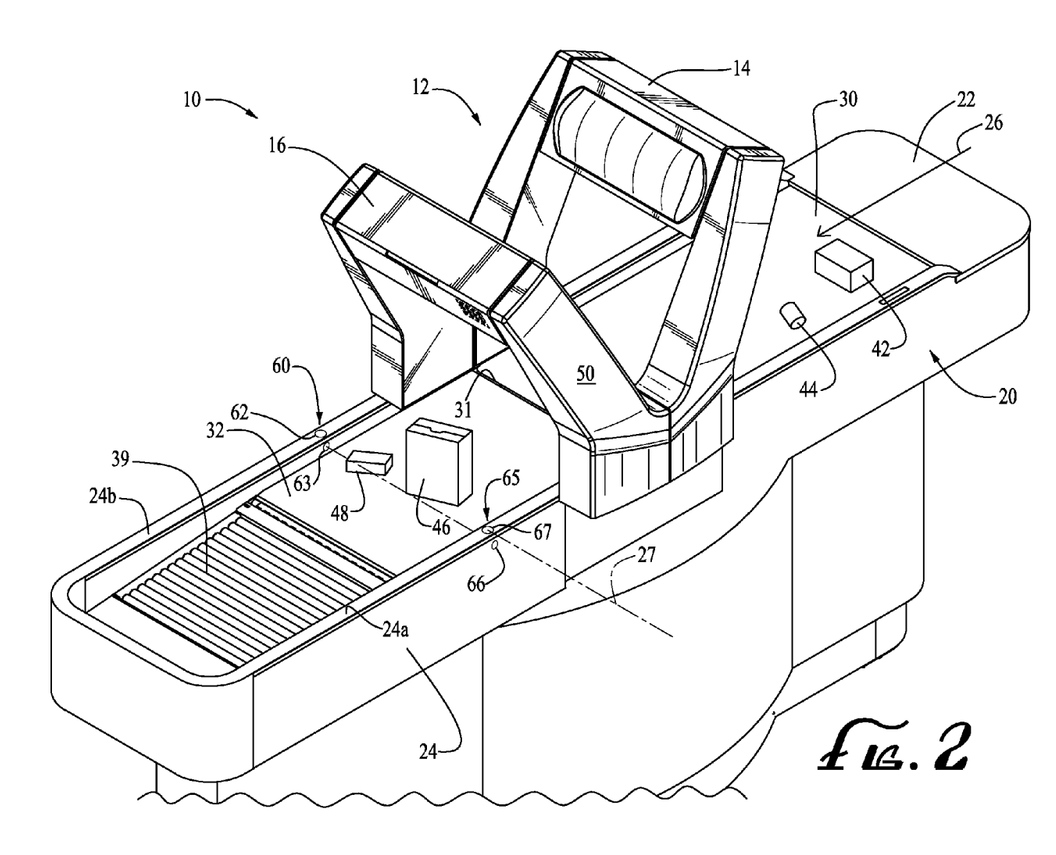
FIG. 2 is a left side isometric view of the automated optical code reading system of FIG. 1.

FIGS. 1-2 illustrate a checkstand area 5 including a check station 70 and one automated reader system in the form of a portal or tunnel checkout system 10 according to one example. The system 10 includes a portal data reader or scanner unit 12 installed on a checkout counter unit 20 such as may be used, for example, in a high-volume retail establishment such as a grocery store or big-box store. The system 10 may also be used in an industrial setting such as a luggage or parcel distribution station, but the operating embodiment will be described primarily in the context of a retail establishment.

The portal data reader unit 12 includes front and rear arch sections 14, 16 and bottom scanner section 18. The checkout counter unit 20 includes an inlet or input end 22, an outlet or exit end 24, and a conveyor system comprising an inlet conveyor section 30 and an outlet conveyor section 32 (collectively conveyor 30/32). Items such as a rectangular package/box 42 and cylindrical can 44 are placed on the inlet or input conveyor section 30 and transported in the direction of direction arrow 26 through the interior of the portal data reader unit 12 (comprising a read zone 13), and then transported out of the interior via outlet or exit conveyor section 32 onto (optional) rollers 39 defining a bagging area 38 where the items are then delivered, boxed, or bagged for removal by the user 3 (e.g., the customer) or other person. Details of an example imager-based data capture system for the portal data reader 12 are further described in U.S. Patent Application No. 61/435,777 and Ser. No. 13/357,356, which are hereby incorporated by reference. Though the indicator systems and methods will be described herein with reference to the portal data reader 12 as an imager-based data reader, the portal data reader may comprise other types of readers such as a laser scanner, an RFID reader or other suitable type of reader, optical code reader, object recognition system/reader, or a combination of such readers.

The conveyor system 30/32 may include one or more various types of mechanical conveying systems to move objects through a three-dimensional read zone 13 of the data reader unit 12 so that optical codes disposed on the objects can be read and the objects added to an item transaction list. The conveyor system 30/32 may include one or more conveyors, such as conveyor belts. In one example, the conveyor system 30/32 is operable to move items in the longitudinal direction (shown by arrow 26) at a relatively fast rate (e.g., 200-400 millimeters/second (mm/sec)) so that items can be quickly passed through the read zone 13, read by the data reader 12, and added to the item transaction list.

The conveyor system 30/32 moves items relative to portal data reader 12 that has multiple data capture devices 14, 16 that form arches over a central portion of the conveyors 30/32. The data capture devices 14, 16 include various components operative to capture information corresponding to the items that are moved through the arches. Although the data capture devices 14, 16 are illustrated as including an open space therebetween, the data capture devices 14, 16 may be embodied in an elongated tunnel formed over or around the conveyors 30/32. The portal data reader 12 may thus be partially open and partially enclosed, such as the example illustrated in FIGS. 1-2, or fully enclosed such as via a tunnel enclosure. Though the portal data reader 12 is illustrated with dual arches 14, 16, alternately a portal data reader may comprise a single arch or more than two arches. The configuration of the dual arches of the capture devices 14, 16 creates an open architecture that provides some barrier/inhibition from a customer reaching into the read zone yet provides sight lines for allowing the customer to generally continuously observe items passing through the arches. A portal data reader need not include any tunnel or even semi-enclosed arches, but a suitable portal data reader may be constructed with more or less openness.

The optional bottom reader section of the data reader 12 is operative for reading the bottom side of items as they are passed over a gap 31. The gap 31 may be disposed between the front/upstream conveyor section 30 and the rear/downstream conveyor section 32 (i.e., at a center position between the front arch 14 and the rear arch 16). Alternately, the gap 31 may be disposed upstream or downstream of the center position. The portal data reader 12 forms a read zone 13 generally defined by the volume beneath and between the arch sections of the data capture devices 14, 16 and above the conveyor 30/32 through which items are passed and may be read by the reading mechanisms with fields of view out from the data capture devices 14, 16 and up through the gap 31. The gap 31 may include an optional transparent or slotted transfer plate that may be placed between the conveyor sections 30, 32 to create a smooth transition of items transported from inlet conveyor section 30 to outlet conveyor section 32. Alternatively, if the optional bottom reader and associated gap 31 are not needed for a given application, the inlet conveyor section 30 and outlet conveyor section 32 may comprise a single, continuous conveyor. Further details of systems and methods for bottom reading are disclosed in U.S. Appl. No. 61/435,744 filed Jan. 24, 2011 and Ser. No. 13/356,417 filed Jan. 23, 2012 (corresponding to U.S. Published Appl. 2012/0187195); and 61/643,820 filed May 7, 2012, each of these applications hereby incorporated by reference.

Figure 3:
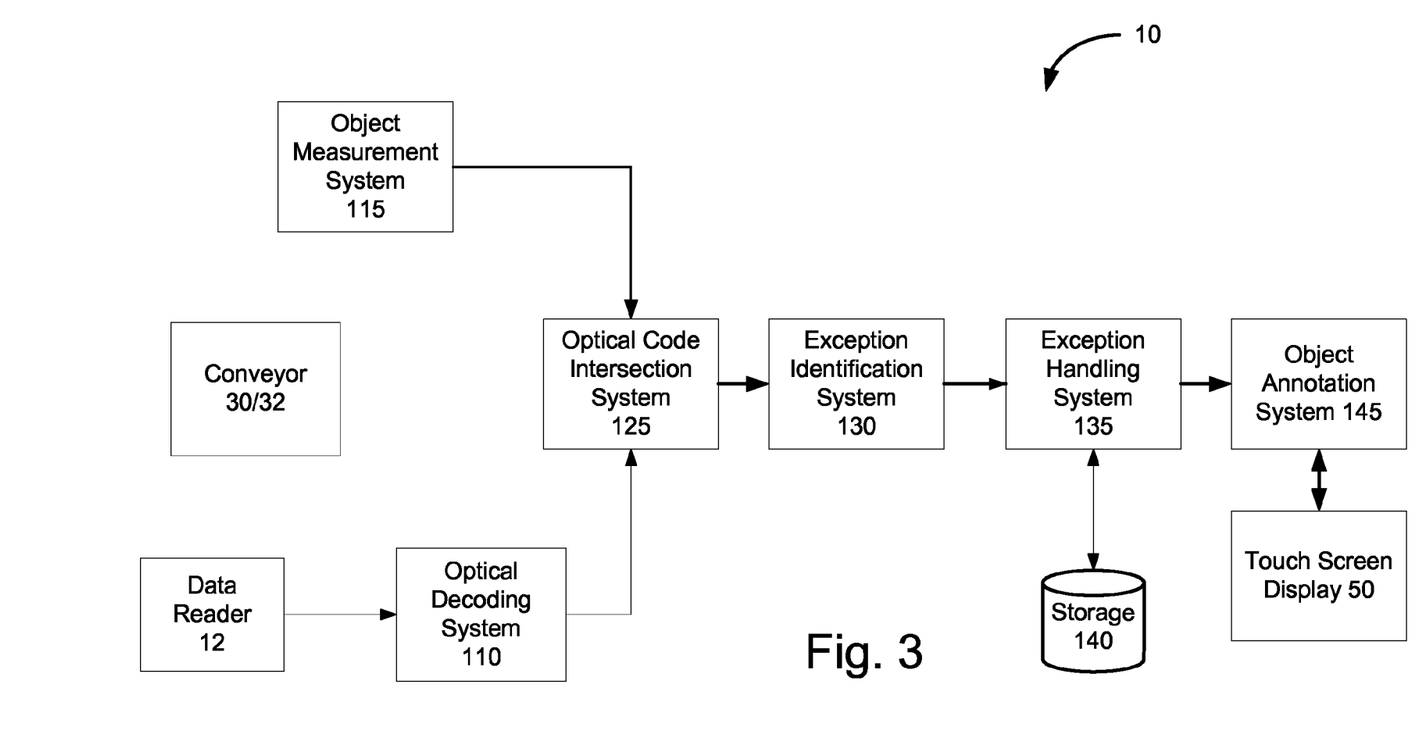
FIG. 3 is a block diagram of an automated optical code reading system according to one embodiment.

FIG. 3 is a block diagram illustrating components of the checkout system 10 of FIGS. 1-2 according to one embodiment. System 10 includes:

(a) A data reader 12 that reads optical codes disposed on items, the data reader 12 is also operable to generate projection data for optical codes represented in the images it captures.

(b) A conveyor 30/32 that moves items 42-48 through the read zone of the data reader sections 14, 16.

(c) A decoding system 110 that processes and decodes the signal acquired by the data reader 12.

(d) An object measurement system 115 positioned along conveyor 30/32 to measure and create three-dimensional models of objects that are transported by conveyor 30/32.

(e) An optical code intersection system 125 that is configured to receive the model data from the object measurement system 115 and the projection data from data reading system 12. The optical code intersection system 125 uses the model data and the projection data to determine whether the back projection rays generated for decoded optical codes intersect with the three-dimensional models.

(f) An exception identification system 130 operable to identify when an exception occurs. Various reading events may occur. One event corresponds to when the system 10 successfully reads an optical code and associates the optical code to an item passed through the read zone of the data reader 12 (e.g., the optical code is associated with only one item and the item has only one optical code associated with it).

(g) An exception handling system 135 in communication with exception identification system 130. The exception handling system 135 determines in what manner to handle (e.g., resolve) an exception identified by exception identification system 130 based on the exception type or other criteria.

(h) Storage 140—Exception handling system 135 may communicate with an optional storage device 140 that stores various types of information associated with exceptions.

(i) An (optional) object annotation system 145 that is operable to generate annotated image data corresponding to visual representations of exceptions to enable an operator to easily identify which objects transported through system 100 have exceptions associated with them.

(j) A touch/display screen 50 for displaying images to the user and/or providing an input mechanism for allowing the user to resolve exceptions.

Other instances/events are not so readily resolved and thus various types of exceptions are possible. For example, one type of exception corresponds to an event in which an object passes through the arch sections 14/16, but an optical code is not read by the reader 12. Another type of exception corresponds to an event in which an optical code is read, but system 10 does not detect that an object has passed through the system 10. Another type of exception corresponds to an event in which one optical code read by the data reader 12 is associated with multiple objects passing through system 10. Another type of exception corresponds to an event in which multiple different optical codes read by system 10 are associated with one object passing through system 10. Various subsets of the above-described exceptions, as well as other types of exceptions, are possible and applicable to the systems/methods described herein.

System 10 includes various modules or subsystems to perform various tasks. One or more of these modules or subsystems may include a processor, associated software or hardware constructs, and/or memory to carry out certain functions performed by the systems. The processors may be embodied in a single central processing unit, or may be distributed such that a system has its own dedicated processor. Moreover, some embodiments may be provided as a computer program product including a machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), EPROMs, EEPROMs, flash memory, magnetic or optical cards, solidstate memory devices, or other types of media/machine-readable medium suitable for storing electronic instructions. Further, embodiments may also be provided as a computer program product including a machine-readable signal (in compressed or uncompressed form). Examples of machine-readable signals, whether modulated using a carrier or not, include, but are not limited to, signals that a computer system or machine hosting or running a computer program can be configured to access, including signals downloaded through the Internet or other networks. For example, distribution of software may be via CD-ROM or via Internet download.

The portal data reader 12 in one example configuration is operable to capture images of objects as the objects are transported along conveyor system 30/32. The portal data reader 12 identifies whether optical codes disposed on the objects are captured in the images and decodes those optical codes that are captured. The portal data reader 12 may include different decoders (e.g., software algorithms, hardware constructs) to decode various types of optical codes including one-dimensional (e.g., linear) codes (e.g., UPC, codabar, code 25, code 39, code 93, code 128, code 11, EAN8, EAN13, plessey, POSTNET) and two-dimensional (e.g., matrix) codes (e.g., aztec code, maxicode, QR code, high-capacity color barcode, data matrix). The system 10 may optionally include a separate optical decoding system 110 that receives and decodes the signal from the data reader 12.

The system 10 may include any of a number of suitable exception detection/determination systems. In one example exception detection system, an object measurement system 115 is positioned along conveyor system 30/32 to measure objects that are transported along conveyor system 30/32. In one example configuration, the object measurement system 115 generates model data that represent three-dimensional models of the objects that are transported along conveyor system 30/32. Further details of this object measurement system 115 are described in U.S. Application No. 61/505,935 and Ser. No. 13/357,459 (which published as US 2013/0020391) incorporated by reference.

The optical code reading system 12 is also operable to generate projection data for optical codes represented in the images it captures. The projection data represent back projection rays that project into a three-dimensional view volume of optical code reading system 12. These back projection rays are associated with locations of the representations of the optical codes in the images. Details of example optical code reading system 12 are also described in U.S. Application No. 61/435,777 and Ser. No. 13/357,356 (which published as US 2013/0020392) incorporated by reference.

The system 10 may also include an optical code intersection system 125 that is configured to receive the model data from object measurement system 115 and the projection data from optical code reading system 12. The optical code intersection system 125 uses the model data and the projection data to determine whether the back projection rays generated for decoded optical codes intersect with the three-dimensional models. Details of the optical code intersection system 125 are also described in U.S. Application No. 61/505,935 and Ser. No. 13/357,459 incorporated by reference.

The system 10 may include an optional exception identification system 130 in communication with the optical code intersection system 125. The exception identification system 130 identifies whether exceptions occur based on intersection determinations made by the optical code intersection system 125. For example, if an object passes through system 100 and the object measurement system 115 generates a three-dimensional model of the object, but no back projection ray of an optical code intersects with the three-dimensional model, exception identification system 130 identifies this event as an exception. The exception identification system 130 is also operable to classify and categorize exceptions by types and subtypes and to generate exception category identification information indicative of the exception types and/or subtypes. The system 10 may also include an optical decoding system 110 that receives and decodes the signal from the data reader 12; an object measurement system 115 positioned along conveyor system 30/32 to measure objects that are transported along conveyor system 30/32. In one example configuration, an object measurement system 115 generates model data that represent three-dimensional models of the objects that are transported along conveyor system 30/32. Further details of the object measurement system 115 are described in U.S. Application No. 61/505,935 and Ser. No. 13/357,459 incorporated by reference.

The system 10 may also include an optional exception handling system 135 in communication with exception identification system 130. The exception handling system 135 determines in what manner to handle (e.g., resolve) an exception identified by exception identification system 130 based on the exception's type. To this end, the exception category identification information generated by exception identification system 130 is communicated to exception handling system 135. Exception handling system 135 is operable to determine that an exception should be resolved in one of multiple ways. For example, exception handling system 135 may determine that an exception is to be automatically resolved by ignoring the exception or manually resolved by an operator. The exception handling system 135 may communicate with an optional storage device 140 that stores various types of information associated with exceptions. The system 10 may also include an optical decoding system 110 that receives and decodes the signal from the data reader 12 and an object measurement system 115 positioned along conveyor system 30/32 to measure objects that are transported along conveyor system 30/32. In one example configuration, the object measurement system 115 generates model data that represent three-dimensional models of the objects that are transported along conveyor system 30/32. Further details of the object measurement system 115 are described in U.S. Application No. 61/505,935 and Ser. No. 13/357,459 incorporated by reference.

The system 10 may also include an optional object annotation system 145 that is operable to generate annotated image data corresponding to visual representations of exceptions to enable an operator to easily identify which objects that are transported through system 10 have exceptions associated with them. The annotated image data generated by object annotation system 145 are communicated to a display screen 50, which displays the visual representations of the exceptions. Further details of the object annotations system 145 are described in U.S. Application No. 61/505,935 and Ser. No. 13/357,459 incorporated by reference.

Once the exception identification system 130 identifies an exception and generates the exception category identification information, the exception handling system 135 determines how to resolve the exception. Exceptions can be resolved in various ways such as ignore the exception, automatically resolve the exception, and manually resolve the exception (either by the user 3 or by some other person). The exception handling system 135 may be user-programmable to handle various exceptions in different ways.

In an example process of using the automated data capture system 10, the customer 3 places items on the inlet conveyor section 30 which transports the items through the data reader 12 and then, on outlet conveyor section 32 to one or more bagging areas 39. If the data capture process is determined to not have been successful for any reason (i.e., that an exception has occurred) then information about this failed attempt to capture the data is communicated to the user 3 or to a checkout clerk so that the exception can be managed. One method for communicating this exception information is to provide one or more images (digital photographs) of the item, a video of the item, a 3D image of the item that can be rotated, and data that was captured but that was too ambiguous to determine if the data was correct. Typically, this data is communicated or displayed to a user 3 via a fixed display screen 50, which may comprise a touch screen. The user 3 reviews the information on the fixed screen 50 and interacts with the screen via a keyboard/keypad 52 and/or touch screen 50 or other input device. The system 10 may also include a payment receipt system (such as a card reader or cash receiver disposed with the keyboard 52 or touch screen 50 or elsewhere) to enable the customer to insert/swipe a credit card or insert cash for payment.

In certain establishments, a number of automated (or semi-automated) checkout systems/stations 10 may be serviced by a checkout clerk, typically seated or standing at a fixed clerk station 70. The clerk station 70 includes a video screen 72 (which may be a touch screen or not) on which images and messages pertaining to exceptions (as well as other information) are displayed. The clerk station may also include a keyboard 74 and/or touch screen 72 for inputting and interacting with the checkout stations 10.

In the example system 10 of FIGS. 1-2, the portal data reader 12 is provided with an indicator lighting scheme for providing feedback information to the user 3 pertaining to the success or failure of reading the items being passed through the read zone 13. The portal data reader 12 provides two external electrical signals to control indicator lights. One signal is intended to control a green light, the other is intended to control a red light. The description of the several embodiments below refers to red and green indicators, but of course, the two signals can be connected to any external device that is electrically compatible and may be of any suitable color or color combinations. Further it is described that the indicator lights are alighted in various sequences or lighting schemes, such alighting may be continuous or non-continuous (e.g., flashing or pulsing), and the intensity when alighted may be constant or may vary (e.g., ramp up).

FIGS. 1-2 illustrate indicator lights at one example desired position downstream of the read zone. A first light or light set 60 on one side of the conveyor 32 and a second light or light set 65 on the other side of the conveyor. The light or light set may comprise a single light or multiple lights. For example, a single light 62 could be used and disposed in a raised position on the top of the rail 24a such that it would be visible to the user from various vantage points. Alternately, the first light or light set 60 may be recessed beneath the surface of the rail 24a, but have one or more light openings such as top opening 62, outside opening 61 and/or inside opening 63. The system may comprise only a single light set (e.g. the first light set 60) but may comprise a second light set 65 on an opposite side of the conveyor and of similar configuration(s).

To produce a red light or a green light, the light 60 may actually comprise two separate lights (one green, one red) or may comprise a single light that may output either red or green depending upon the control signal. Alighting both red and green may produce a third color (yellow). Alternately, the first light 60 may be one color (e.g. red) and the second light 65 the other color (e.g., green). In another example, the lights may comprise only a single color (e.g., red) indicating a bad read or exception and good reads are assumed if a red indicator is not actuated. The lights 60, 65 may be implemented in a variety of indicator modes, modes that may be set at the manufacturer, or customized for/by the user. In yet another example, the lights may comprise a multi-color RGB LED capable of producing a number of different colors.

In one mode, the red and green signals produce pulses having configurable, constant durations. The red or green pulse begins when the complete item is processed by the data reader 12. The Point of Sale (POS) interface message describing the item is also sent at this time. In another indicator mode, the duration of the red and green signals depend on the belt speed and the item length. The indicator light alights (e.g., turns on) once the leading edge of the item (e.g. item 46) reaches a given downstream indicator location (shown by dashed line 27) along the conveyor transport path 26 corresponding to the position of the indicator lights 60, 65. The indicator light 60 remains alighted until the trailing edge or portion of the item 46 reaches the indicator location 27 (i.e., turns off upon the trailing end of the item reaching the indicator location 27). Alternately, the indicator light 60 may be turned off after a predetermined time period. The result is the indicator light 60 is activated/alighted during the entire time the item 46 is passing the indicator location 27 proximate the indicator light 60. If there are no side-by-side items, then the operation is simplified—either the red or the green indicator is activated, depending on the status of the item. The alighted or activated function of the indicator lights 60 (or any of the other lights described herein) may be continuous (e.g., a constant, continuously on mode), flashing, blinking, ramping up or down in intensity, changing colors, or some other suitable sequencing.

In a first example rule set, for items with exactly one barcode detected, the green light is activated (=1 code). For items with no barcode detected (=0 codes) or more than one barcode (>1 barcode), the red indicator is activated. Other rule sets may be defined for choosing which lights to activate, but the first example rule set distinguishes common cases requiring operator intervention for an item, or not. When no items are passing the light(s) 60, 65, both indicators (green and red) are off. When any item is passing the indicator, either the red or the green signal is activated. Other rule sets/operational schemes will be described later in this specification.

As previously described, the portal data reader 12 includes a system that tracks items passing through the read zone, determining the position and size/footprint of the item at all times. For example, the system may be provided with a vertical light curtain detection system that determines the length of the item as the item passes through the curtain, thus building an object model. Knowing the leading and trailing edge positions at a given time, and the item speed (typically a constant speed), it can be determined when the leading edge reaches the indicator location 27. Item speed may be determined by a suitable method such as (1) measured directly from tracking the item, (2) calculated based on an average speed for recently tracked items (e.g., the last several items tracked), (3) conveyor speed (typically a constant, known speed). The indicators 60, 65 are disposed at the side rails in line with the location 27 so when they alight when the leading edge of the item reaches location 27, the user then associates the signal of the indicator light with the proximately located item.

In some embodiments, the reader 10 includes software executed by a processor or controller to determine or track the position of the item 46 through the read zone based on dead reckoning. For example, the processor observes the times the item 46 passes the leading and trailing light curtains, or the times that the item 46 is detected by object sensors such as optical detectors. Based on these times and an assumed constant, predetermined velocity of the conveyor 30/32, the processor can correlate optical codes read in the read zone with the item 46 and estimate the position of the item 46 at a given time. This correlation allows the reader 10 to differentiate between multiple reads of the same item, and distinguish identical labels on multiple items. Dead reckoning also allows the processor to determine the presence of multiple distinct labels on individual items, such as an overpack label for a multi-pack of items (e.g., an overpack of a twenty-four bottle package of bottled water, each bottle has its own barcode, but the overpack packaging has its own barcode representing the entire package).

Certain other example detection/indicator scenarios or rule sets are described in the following.

A. One item, one barcode read—in a first notification scheme, a single item 46 is detected passing through the read zone and only a single barcode on the item is read. Further (optional) verification also confirms that the item is correctly identified. Light indicators 60, 65 (on one or both sides of the conveyor 32) are alighted green for the duration of the item 46 (from the leading edge to the trailing edge) passing the indicator location 27.

B. One item, no barcode read—a single item 46 is detected as having passed through the read zone, but the reader 12 was unable to read a barcode. Light indicators 60, 65 are alighted red (on one or both sides of the conveyor 32) for the duration of the item 46 (from the leading edge to the trailing edge) passing the indicator location 27.

C. One item, two barcodes read on that item—several indicator schemes may be followed depending upon system options: (a) if the second barcode is a valid read (for example a mark-down code) green light indicators 60, 65 are alighted green (on one or both sides of the conveyor 32) for the duration of the item 46 (from the leading edge to the trailing edge) passing the indicator location 27; (b) if two barcodes are an exception, indicators 60, 65 are alighted red (on one or both sides of the conveyor 32) for the duration of the item 46 (from the leading edge to the trailing edge) passing the indicator location 27; (c) if two barcodes are a potential exception, (1) the barcodes are passed to the POS system which responds and the indicators 60, 65 are alighted the appropriate color (e.g., red, green or yellow) in response, (2) the conveyor may optionally be stopped and both green and red indicator are activated (e.g., producing a yellow light) and an alert signal is sent to the clerk to review an image remotely and, in response, either approve (green light) or disapprove (red light).

If two overlapping items are detected, for example as shown in FIGS. 1-2 a second item 48 beside the first item 46, the system may be operable in various operation modes/scenarios:

Scenario (1) two items are detected as overlapping—that condition may be determined as an exception and both indicators 60, 65 may be alighted red for the duration of the leading to trailing edges of the items 46, 48 passing the indicator location 27.

Scenario (2) indicators 60, 65 operating together (non-independently)—both item 46 and item 48 are detected having passed through the read region and with a single barcode on each of the item 46 and the item 48 being read, green light indicators 60, 65 are alighted for the duration of the items 46/48 (from the leading edge to the trailing edge) passing the indicator location 27; if either item 46 or 48 is detected having passed through the read zone and without good barcode read (e.g., no barcode or two barcodes on an item) the indicators 60, 65 are alighted red for the duration from leading to trailing edge of the items 46, 48 passing the indicator location 27. Alternately, the indicator lights 60, 65 may be turned off after a predetermined time period.

Scenario (3) indicators 60, 65 operating independently—item 46 is detected having passed through the read region and with a single barcode on the item 46 being read, light indicators 60 on the adjacent side are alighted green for the duration of the item 46 (from the leading edge to the trailing edge) passing the indicator location 27; item 48 is detected having passed through the read region and with a single barcode on the item 48 being read, light indicators 65 on the adjacent side are alighted green for the duration of the item 48 (from the leading edge to the trailing edge) passing the indicator location 27. Similarly, if either of the items 46 or 48 are not accurately read (e.g., no barcode, two barcodes) the corresponding/adjacent indicator 60, 65 is alighted red for the duration from leading to trailing edge of the respective item 46, 48 passing the indicator location 27.

Although the checkstand system 10 in FIGS. 1-2 is depicted with lighting in/on both side rails 24a, 24b, it should be recognized that various illumination configurations may be implemented. In one example, only the illumination on one of the side rails (either side rail 24a or 24b) is provided. The illumination depicted in FIGS. 1-2 may comprise multi-colored (e.g., tri-colored) or separate primary colored LEDs housed in cans, covered with light diffusing caps or lenses, however, any light source capable of suitable illumination may be used, including rope lighting, segmented fiber optic lighting, or incandescent bulbs.

Figure 4:
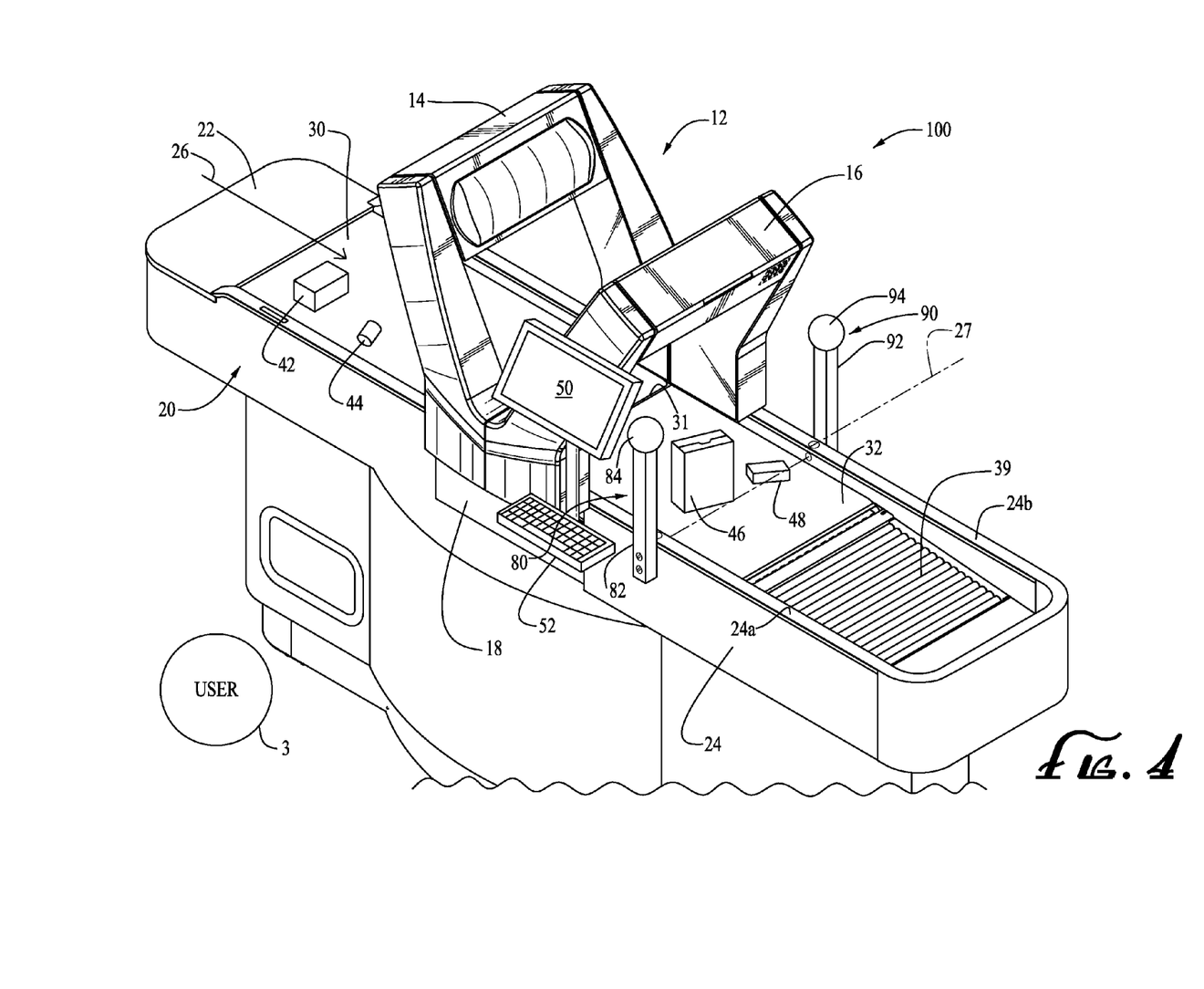
FIG. 4 is a right side isometric view of an automated optical code reading system according to a second embodiment.

The system 10 of FIGS. 1-2 illustrates the indicator lights disposed along the rails 24a, 24b of the exit conveyor 32, but other configurations may be implemented. FIG. 4 illustrates one such alternate system 100 with pole-mounted indicator lights 80, 90. Light 84 is disposed atop pole 82 and light 94 is disposed atop pole 92. In such a raised position, the lights 84, 94 may be in a more visible position to the user. The poles 82, 92 themselves may comprise lighted elements.

Figure 5:
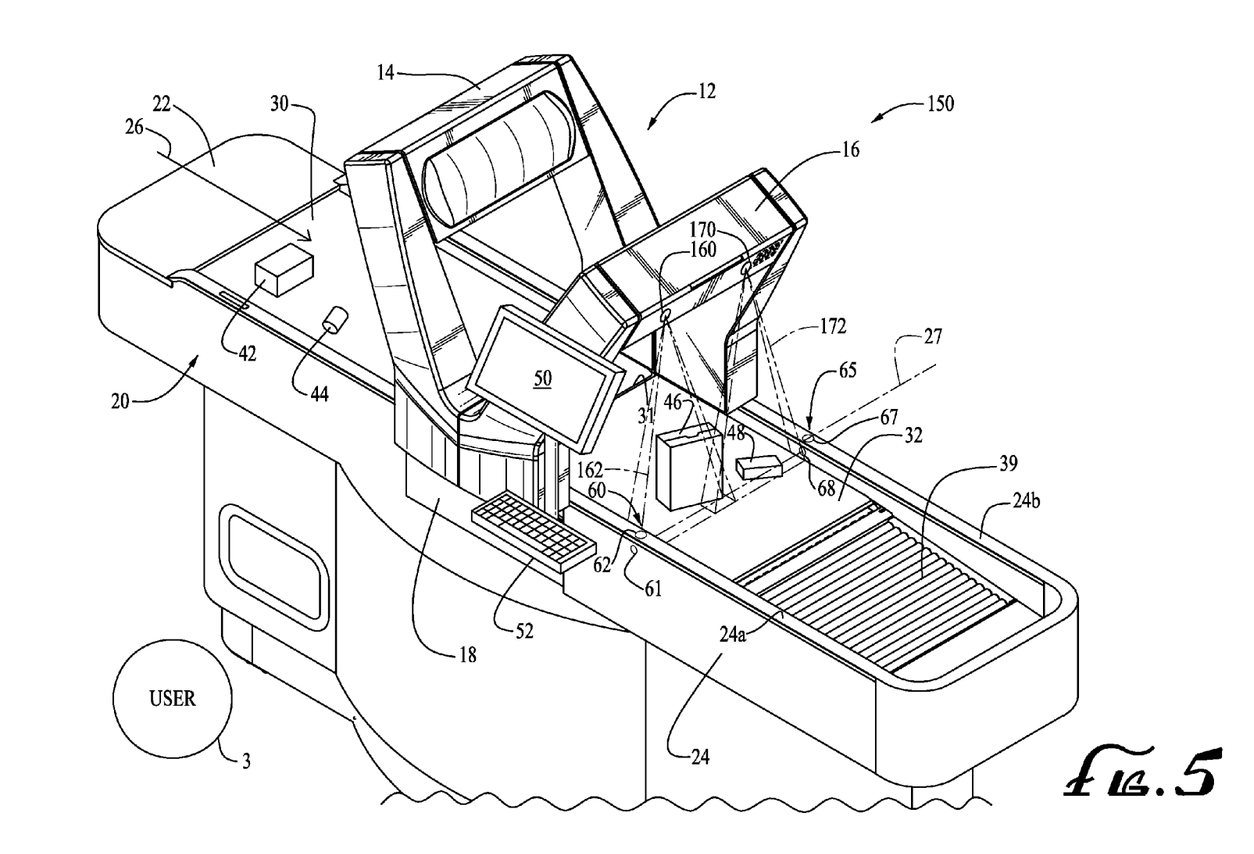
FIG. 5 is a right side isometric view of an automated optical code reading system according to a third embodiment.

In another configuration shown in the system 150 of FIG. 5, one or more lighting elements 160, 170 are mounted or disposed in the trailing arch section 16, each lighting element 160, 170 projecting a light spot or light curtain down onto the exit conveyor 32 alighting the item 46 (and/or 48) with a green or red light indicating a good read or an exception in similar fashion as in the prior embodiments. To provide indicators for multiple items, a series of lighting elements 160, 170 (for example two or more) may be positioned on the trailing arch section 16, each lighting element alighting a different section of the exit belt 32 along the indicator location 27 for alighting multiple overlapping items. For example, lighting element 160 may project a (e.g., red or green color) light spot or curtain 162 on one side of the conveyor 32 for alighting the item 46, and lighting element 170 may project a (e.g., red or green) light spot or curtain 172 for alighting item 48.

Figure 6:
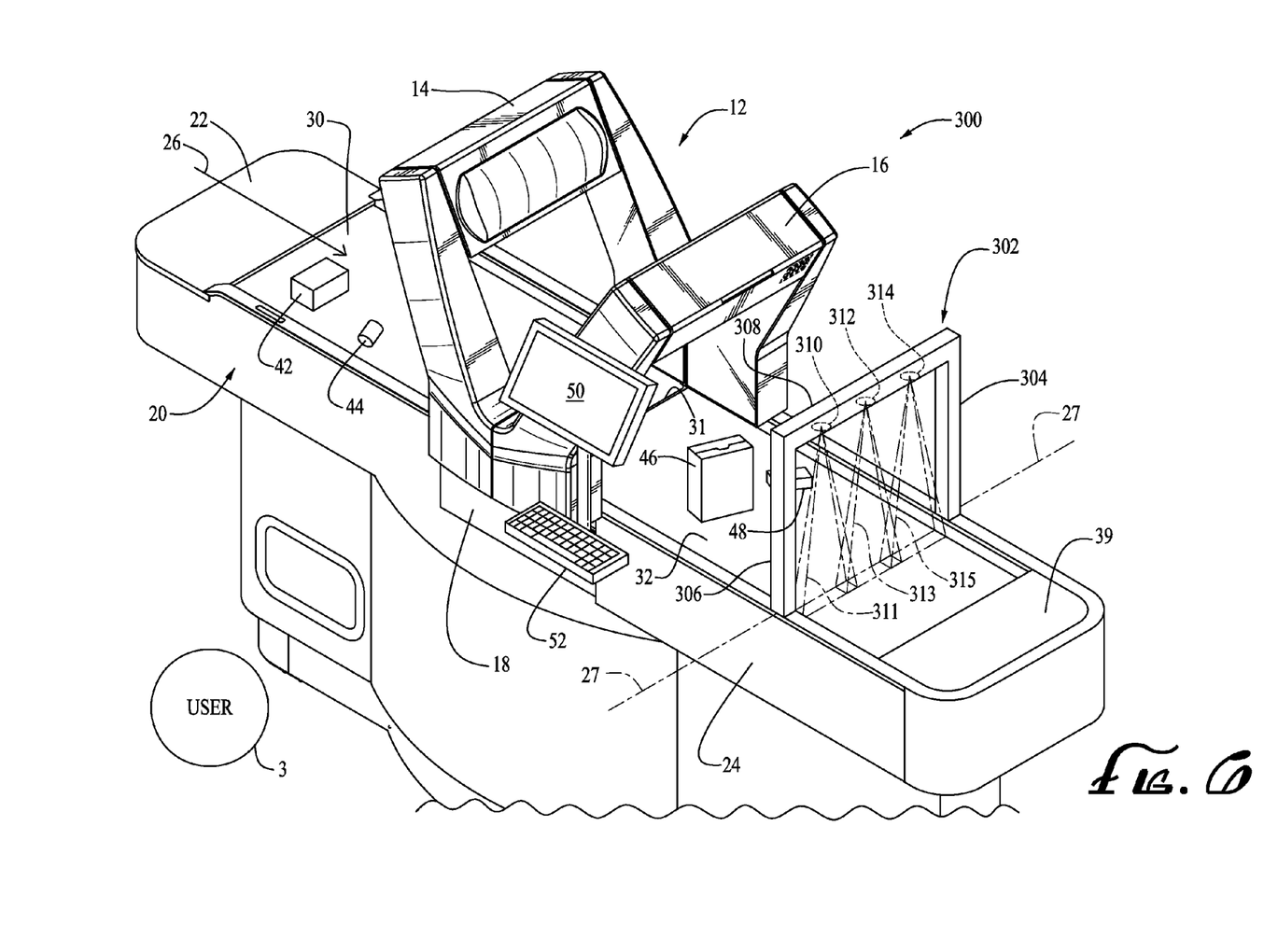
FIG. 6 is a right side isometric view of an automated optical code reading system according to a fourth embodiment.

FIG. 6 illustrates another example system 300 having one or more light projection elements mounted or disposed in a separate arch structure 302 positioned downstream of the portal data reader 12. The arch structure 302 includes right and left leg sections 304, 306 supporting an upper central section 308 spanning the exit conveyor section 32. Each of the light projection components projects a light spot or light curtain down onto the exit conveyor section 32 alighting the item 46 (and/or item 48) with a green or red (or some other color) light indicating a good read or an exception in similar fashion as in the prior embodiments. To provide indicators for multiple items, a series of lighting elements (for example two or more) may be positioned in or on the arch 302, each lighting element alighting a different section of the exit belt 32 along the indicator location 27. For alighting multiple overlapping items, for example, multiple light projection elements may be provided. In the example of FIG. 6, three lighting elements are provided, wherein first lighting element 310 may project a light spot or curtain 311 (red or green) on one side of the belt 32 for alighting the item 46, and second lighting element 312 may project a light spot or curtain 313 (red or green) for alighting item 48, and third lighting element 314 may project a light spot or curtain 315 (red or green) for alighting a third item.

Figure 7:
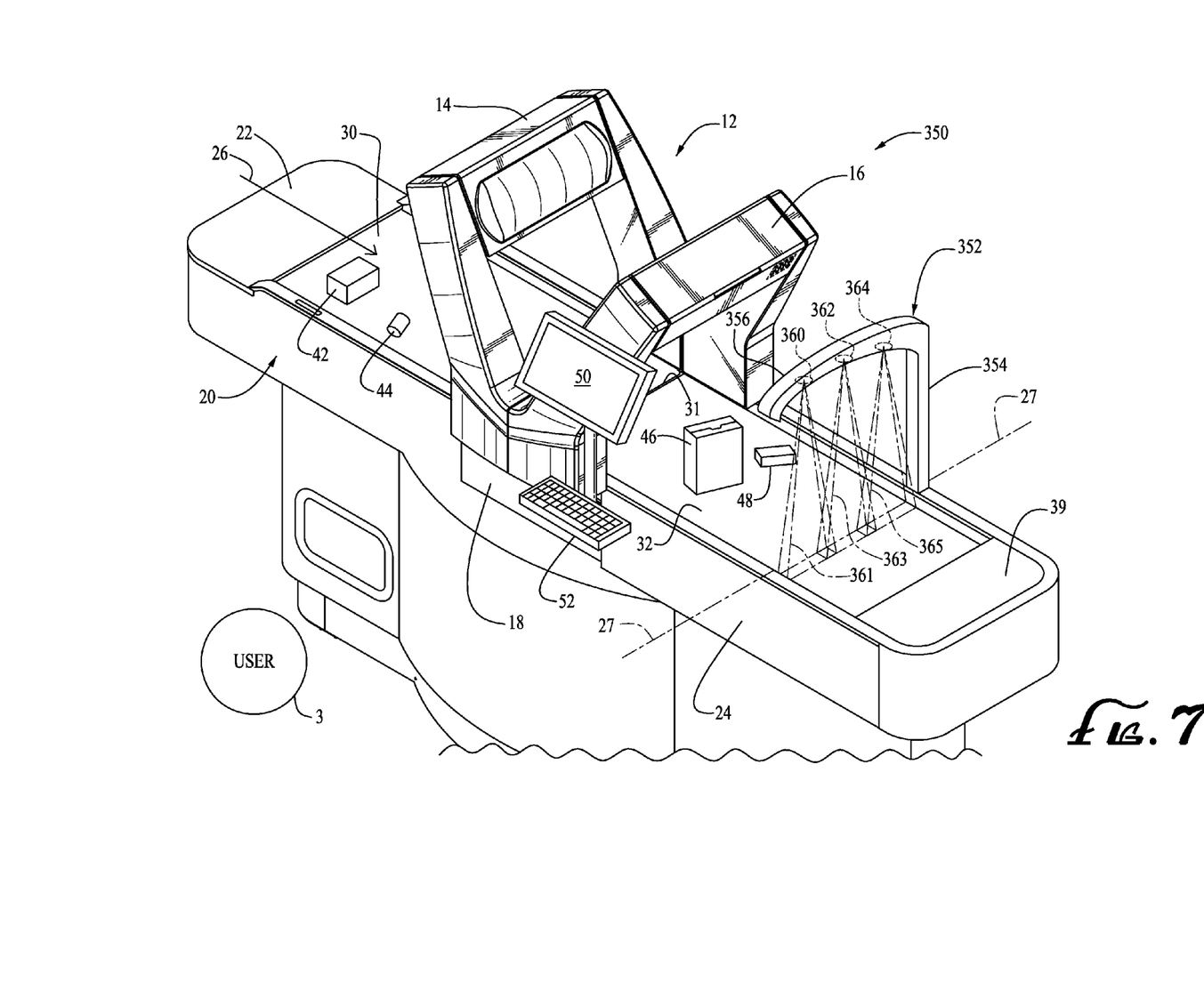
FIG. 7 is a right side isometric view of an automated optical code reading system according to a fifth embodiment.

FIG. 7 illustrates another example system 350 having one or more light projection elements mounted or disposed in a separate arch (or overhanging post) structure 352 positioned downstream of the portal data reader 12. The structure 352 includes a single post or leg section 354 supported/attached to the outlet end 24 of the housing/counter opposite the user 3, and an upper section 356 spanning above the exit conveyor section 32. Each of the light projection components projects a light spot or light curtain down onto the exit conveyor 32 alighting the item 46 (and/or 48) with a green or red light indicating a good read or an exception in similar fashion as in the prior embodiments. To provide indicators for multiple items, a series of lighting elements (for example two or more) may be positioned in or on the arch 352, each lighting element alighting a different section of the exit belt 32 along the indicator location 27. For alighting multiple overlapping items, for example, multiple light projection elements may be provided. In the example of FIG. 7, three lighting elements are provided in/on the upper section 356, wherein first lighting element 360 may project a light spot or curtain 361 (red or green) on one side of the belt 32 for alighting the item 46, and second lighting element 362 may project a light spot or curtain 363 (red or green) for alighting item 48, and third lighting element 364 may project a light spot or curtain 365 (red or green) for alighting a third item.

Figure 8:
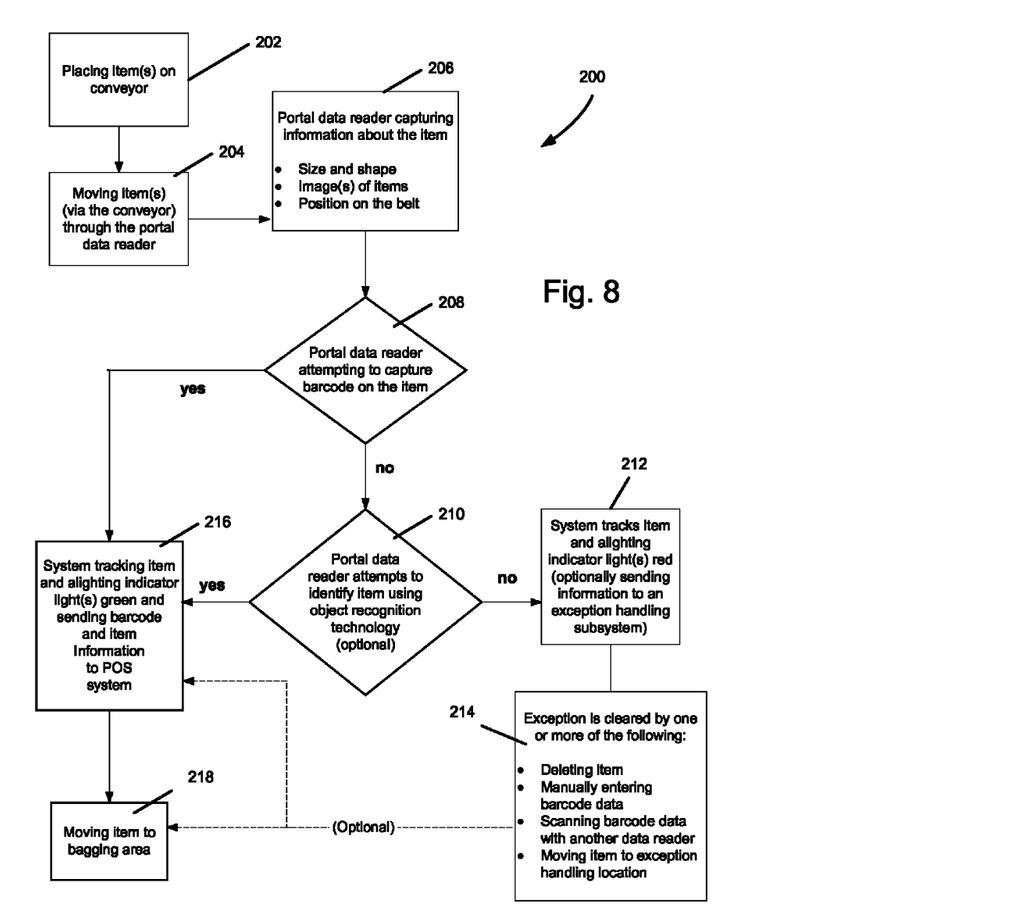
FIG. 8 is a flowchart of a method of automated optical code reading and exception handling.

FIG. 8 is a flowchart of an item handling and indicator method 200 according to one embodiment, comprising the following steps. For further description, the method steps are described with reference to elements of the system 10 and portal data reader 12 relative to item 46 as illustrated in the example of FIG. 1.

Step 202, placing the item 46 on the inlet end 30 of the (moving) conveyor 30/32.

Step 204, via the conveyor 30/32, moving the item 46 through the portal data reader 12.

Step 206, via the portal data reader 12, capturing information about the item, information may include:
  item size and/or shape;
  capturing a picture/image of the item;
  position of the item on the conveyor 30/32.
From this information and the belt speed, the system 10 may track the movement of the item through the portal data reader 12.

Step 208, via the portal data reader 12, attempting to capture optical code information from the item 46. If successful in capturing and reading/decoding, proceeding to Step 216; if unsuccessful, proceeding to Step 210 (or directly to Step 212 if the system does not include object recognition).

Step 210, via the portal data reader 12, attempting to identify the item using object recognition techniques such as visual pattern recognition. If YES, proceeding to Step 216; if NO, proceeding to Step 212 (Exception handing). Step 210 is omitted if the system is not provided with object recognition capability.

Step 212, from an unsuccessful identification (from Step 208 and/or Step 210), alighting the indicator lights 60, 65 in red from a moment when a leading edge of the item 46 reaches the indicator location 27 until the trailing edge of the item 46 passes the indicator location 27.

Step 214—clearing the exception, for example, exception clearing may be accomplished by one or more of the following options:
  deleting the item from the transaction and providing suitable instructions to the user 3 (e.g., a message on the screen 50 instructing the user to remove the item from the exit end 32 of the conveyor and return it to the inlet end 30 whereby the system may track the movement of the item 46, expect its return to the inlet end 30, and re-pass the item through the portal data reader 12);
  the user or clerk manually entering optical code data either from direct view of the item 46 itself (using for example the input keyboard 52), or optionally by examining the digital image/photograph of the item (e.g., the clerk may examine the digital image/photograph remotely on a display screen 72);
  scanning the optical code on the item with another data reader such as one incorporated into a mobile device.

Step 216, from a successful item identification from either Step 208 or Step 210, alighting the indicator lights 60, 65 in green from a moment when a leading edge of the item 46 reaches the indicator location 27 until the trailing edge of the item 46 passes the indicator location 27 and sending data acquired from the optical code and/or item information to the POS system; proceeding to Step 218.

Step 218, via the downstream conveyor section 32, moving the item to the bagging area 39.

Figure 9:
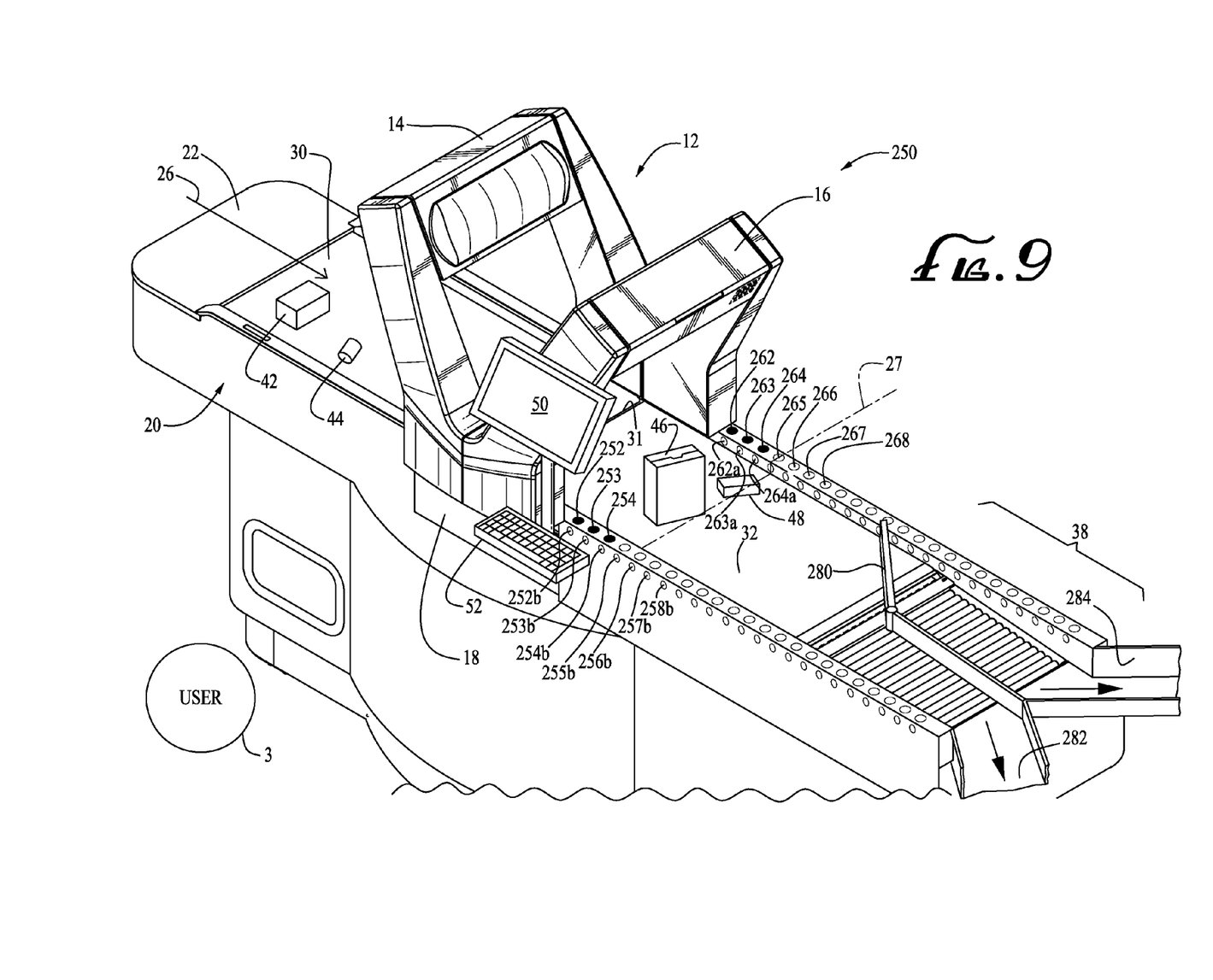
FIG. 9 is a right side isometric view of an automated optical code reading system according to a sixth embodiment.

FIG. 9 illustrates another checkout system 250 having a series of lights arranged at a suitable location along the side rails proximate the exit end 32. The system 250 has on the left rail a series of lights 252, 253, 254, etc. along the top side of the left rail and corresponding lights 252b, 253b, 254b, 255b, 256b, 257b, 258b, etc. along the outside of the left rail and a series of corresponding lights (not visible in the figure but similar to the lights 262a, 263a, 264a of the right side rail) along the inside of the left rail. Similarly, the right side rail has a series of lights 262, 263, 264, 265, 266, 267, 268, etc. along the top side of the right rail and corresponding lights 262b, 263b, 264b, etc. along the inside of the right rail and a series of corresponding lights along the outside of the right side rail (not visible in the figure but similar to the lights 252b, 253b, 254b, etc. of the left side rail). For convenience a certain number of the lights are numbered, but lights are illustrated along the length of the exit conveyor section 32, and any suitable number of lights and locations may be implemented.

As an item, such as item 46, exits read zone of the portal data reader 12, corresponding lights along the side rails alight, the number of lights corresponding to the length of the item (from leading edge to trailing edge) and in a color (e.g., red or green) corresponding to whether the item 46 was identified by the portal data reader 12. Thus a band of lights (the number of adjacent lights corresponding to the length of the item 46) will progress along the side rails to or into the bagging area 38.

FIG. 9 also illustrates an alternate exception handling system comprised of a diverter 280 operable to pivot from one side to the other so as to divert the item along a desired path to either the first exit path 282 or second exit path 284. In one example operation, the diverter is either (1) moved to a first position as shown in FIG. 9 directing items that have been successfully identified toward the user and along the first exit path 282 where they can be bagged or otherwise taken by the user as purchased, or (2) moved to a second position for directing items that have not been successfully identified by the portal data reader 12 away from the user and along the second item path 284 for further exception handling.

The terms and descriptions used above are set forth by way of illustration only and are not meant as limitations. Those skilled in the art will recognize that many variations can be made to the details of the above-described embodiments without departing from the underlying principles of the invention.

The invention claimed is:

1. An automated checkout system, comprising
    a data reader having a read zone, the data reader being operable to identify items being transported through the read zone;
    a conveyor system having an input zone and an exit zone, the conveyor system configured to automatically transport the items from the input zone, through the read zone of the data reader, and to the exit zone;
    a lighting indicator system disposed at an indicator location proximate the exit zone of the conveyor system, the lighting indicator system turning on upon the item reaching or entering the indicator location, wherein the lighting indicator system comprises a series of lights arranged along a side rail proximate the exit zone and alights a given color in response to input from the data reader,
    wherein the lighting indicator system is operative to turn on and alight continuously upon a leading portion of the item reaching the indicator location.

2. A system according to claim 1 wherein the data reader includes an optical code reading system operable for reading optical codes on the items for identifying the items transported through the read zone.

3. A system according to claim 1 wherein the data reader includes an optical recognition system operable for using optical recognition to identify the items being transported through the read zone.

4. A system according to claim 1 wherein the data reader comprises a portal data reader unit including one or more arch sections disposed over a portion of the conveyor system and defining the read zone.

5. A system according to claim 1 further comprising a controller operative (a) to generate a first signal corresponding to a successful identification of an item transported through the read zone and (b) to generate a second signal corresponding to an unsuccessful identification of the item transported through the read zone,
    wherein in response to the first signal, the lighting indicator alights a first color corresponding to the successful identification,
    wherein in response to the second signal, the lighting indicator alights a second color corresponding to the unsuccessful identification.

6. A system according to claim 5 wherein the first color is green and the second color is red.

7. A system according to claim 1 further comprising an imaging system and a display monitor, wherein the imaging system is operative for acquiring an image of the item for sending to the display monitor.

8. A system according to claim 1 wherein the lighting indicator system comprises a lighting source disposed over the conveyor and operative to project a light beam or curtain down onto the item at the indicator location thereby alighting at least a portion of the item with a light of the given color.

9. An automated checkout system, comprising
    a data reader having a read zone, the data reader being operable to identify items being transported through the read zone;
    a conveyor system having an input zone and an exit zone, the conveyor system configured to automatically transport the items from the input zone, through the read zone of the data reader, and to the exit zone;
    a lighting indicator system disposed at an indicator location proximate the exit zone of the conveyor system, the lighting indicator system turning on upon the item reaching or entering the indicator location, wherein the lighting indicator system alights a given color in response to input from the data reader,
    wherein the lighting indicator system is operative to turn on upon a leading portion of the item reaching the indicator location and then turn off upon a trailing portion of the item reaching the indicator location.

10. An automated checkout system, comprising
    a data reader having a read zone, the data reader being operable to identify items being transported through the read zone;
    a conveyor system having an input zone and an exit zone, the conveyor system configured to automatically transport the items from the input zone, through the read zone of the data reader, and to the exit zone;
    a lighting indicator system disposed at an indicator location proximate the exit zone of the conveyor system, the lighting indicator system turning on upon the item reaching or entering the indicator location,
    wherein the lighting indicator system comprises indicator lights disposed in or on side rails at opposite sides of the conveyor system in the exit zone and alights a given color in response to input from the data reader.

11. A system according to claim 10 wherein the indicator lights are disposed on posts extending up from the side rails.

12. A method of operation for automated checkout system, comprising the steps of
    transporting, via a conveyor system, items along an item path through a read zone of a data reader and to an exit zone;
    via a tracking system, tracking a first item as the first item is moved along the item path;
    via the data reader, attempting to identify the first item by reading an optical code on the first item as the first item is transported through the read zone; and
    alighting an indicator light disposed at an indicator location in the exit zone of the conveyor system, the indicator light alighting upon the first item reaching or entering the indicator location, wherein the indicator light is from a series of lights arranged along a side rail proximate the exit zone, wherein the indicator light alights continuously upon the leading portion of the item reaching the indicator location.

13. A method according to claim 12 wherein the indicator light alights a given color corresponding to input from the data reader.

14. A method according to claim 12 further comprising
    alighting the indicator light a given first color if the data reader successfully identifies the first item;
    alighting the indicator light a given second color if the data reader fails to identify the first item.

15. A method according to claim 12 further comprising
    generating a first signal corresponding to a successful identification of the first item having passed through the read zone;
    generating a second signal corresponding to an unsuccessful identification of the first item having passed through the read zone;
    in response to the first signal the lighting indicator alights a first color corresponding to a successful read;

in response to the second signal the lighting indicator alights a second color corresponding to an unsuccessful read.

16. A method according to claim 12 further comprising determining an exception to item identification if the data reader fails to identify the first item.

17. A method according to claim 16 wherein the step of determining an exception to item identification includes attempting to identify the first item with the data reader by reading an optical code on the first item.

18. A method according to claim 16 wherein the step of determining an exception to item identification further includes attempting to identify the first item with the data reader by using optical recognition to identify the first item.

19. A method according to claim 12 further comprising
via the tracking system, tracking a second item as the second item is transported adjacent to the first item and along the item path;
via the data reader, attempting to identify the second item being transported through the read zone;
alighting a second indicator light disposed at an indicator location in the exit zone of the conveyor system, the indicator light alighting once the second item reaches the indicator location.

20. A method of operation for automated checkout system, comprising the steps of
transporting, via a conveyor system, items along an item path through a read zone of a data reader and to an exit zone;
via a tracking system, tracking a first item as the first item is moved along the item path;
via the data reader, attempting to identify the first item by reading an optical code on the first item as the first item is transported through the read zone; and
alighting an indicator light disposed at an indicator location in the exit zone of the conveyor system, the indicator light alighting upon the first item reaching or entering the indicator location,
wherein the indicator light alights upon a leading portion of the first item reaching the indicator location and then turns off upon a trailing portion of the first item reaching the indicator location.

21. A method according to claim 20 wherein the indicator light is alighted in a given fashion selected from the group consisting of: pulsing, flashing, continuously on, ramping up, and ramping down.

22. A method of operation for automated checkout system, comprising the steps of
transporting, via a conveyor system, items along an item path through a read zone of a data reader and to an exit zone;
via a tracking system, tracking a first item as the first item is moved along the item path;
via the data reader, attempting to identify the first item by reading an optical code on the first item as the first item is transported through the read zone; and
alighting an indicator light disposed at an indicator location in the exit zone of the conveyor system, the indicator light alighting upon the first item reaching or entering the indicator location;
via the tracking system, tracking a second item as the second item is transported adjacent to the first item and along the item path;
via the data reader, attempting to identify the second item being transported through the read zone;
alighting a second indicator light disposed at an indicator location in the exit zone of the conveyor system, the indicator light alighting once the second item reaches the indicator location,
wherein the indicator light turns on upon a leading portion of the second item reaching the indicator location.

23. A method according to claim 22 wherein the indicator light turns off upon a trailing portion of the second item reaching the indicator location.

24. An automated checkout system comprising
a data reader having a read zone, the data reader being operable to identify items being transported through the read zone;
a conveyor system operable for transporting the items through the read zone of the data reader;
a successful read indicator system comprising a lighting system operable for projecting light beams of a selected plurality of different colored beams onto or in the vicinity of the items, the selected color for a light beam being projected onto an item upon the item reaching an indicator location, the selected color depending upon whether the item was successfully identified by the data reader, wherein the indicator system is operative to turn on the light beam upon a leading portion of the item reaching the indicator location and then turn off upon a trailing portion of the item reaching the indicator location.

* * * * *